Sept. 18, 1928.
W. W. LASKER
1,684,545
NUMBERING AND COUNTING DEVICE
Filed May 15, 1924     4 Sheets-Sheet 1
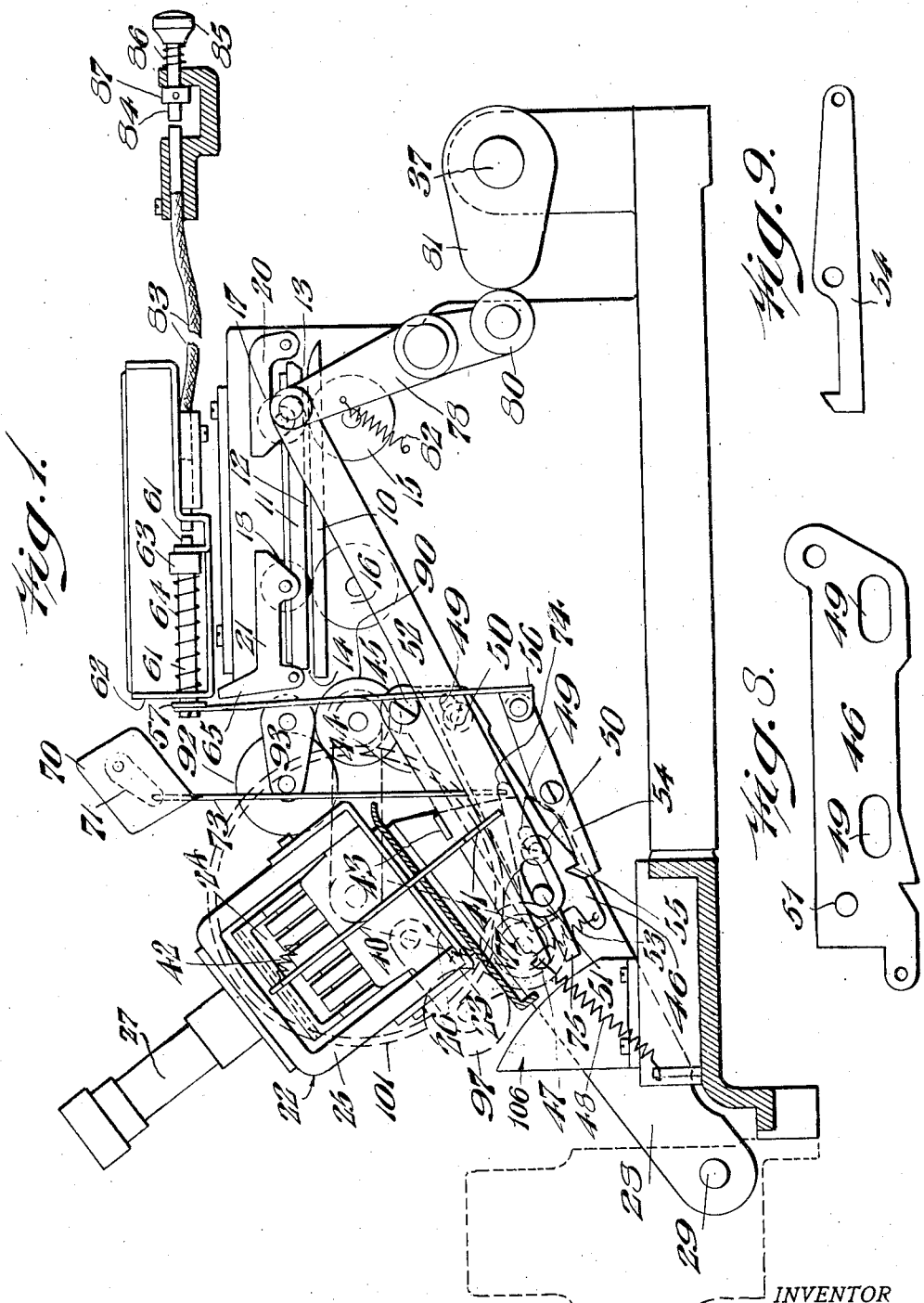
INVENTOR
William W. Lasker.
BY Robert M. Barr
ATTORNEY Sept. 18, 1928. 1,684,545
W. W. LASKER
NUMBERING AND COUNTING DEVICE
Filed May 15, 1924    4 Sheets-Sheet 2
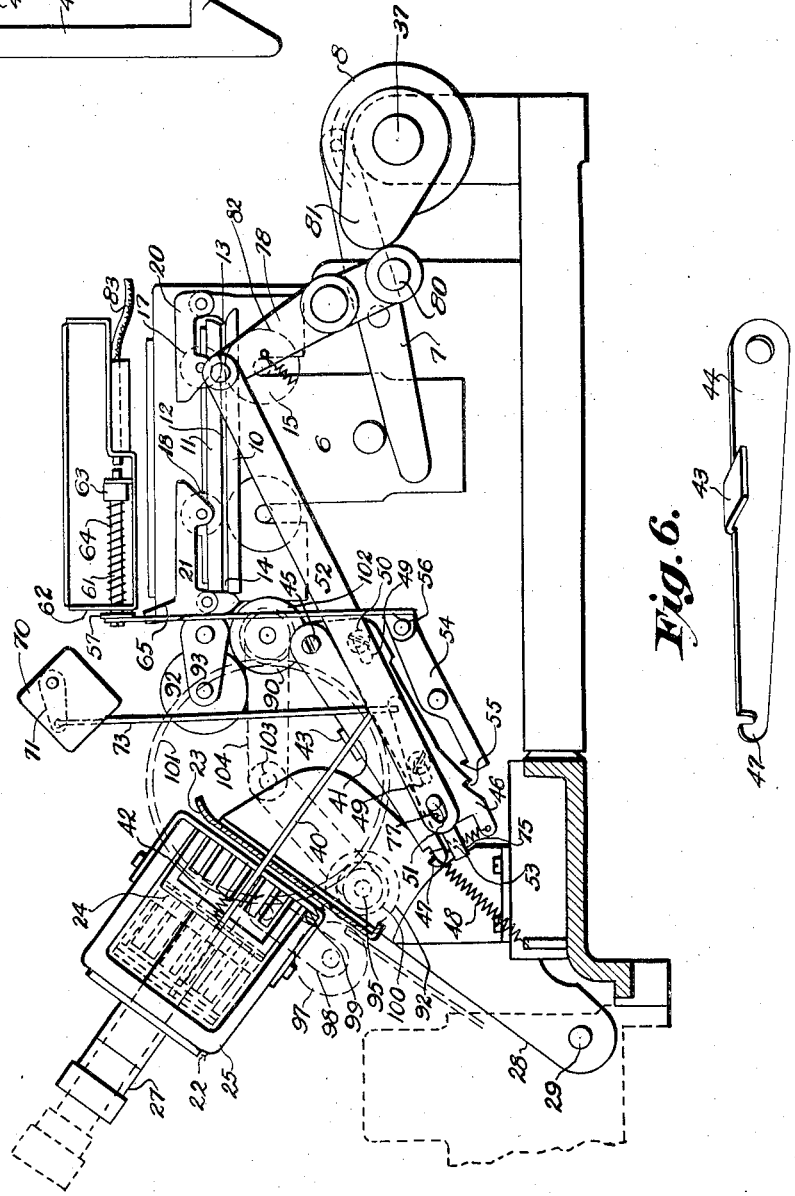

Sept. 18, 1928.
W. W. LASKER
1,684,545
NUMBERING AND COUNTING DEVICE
Filed May 15, 1924 4 Sheets-Sheet 3
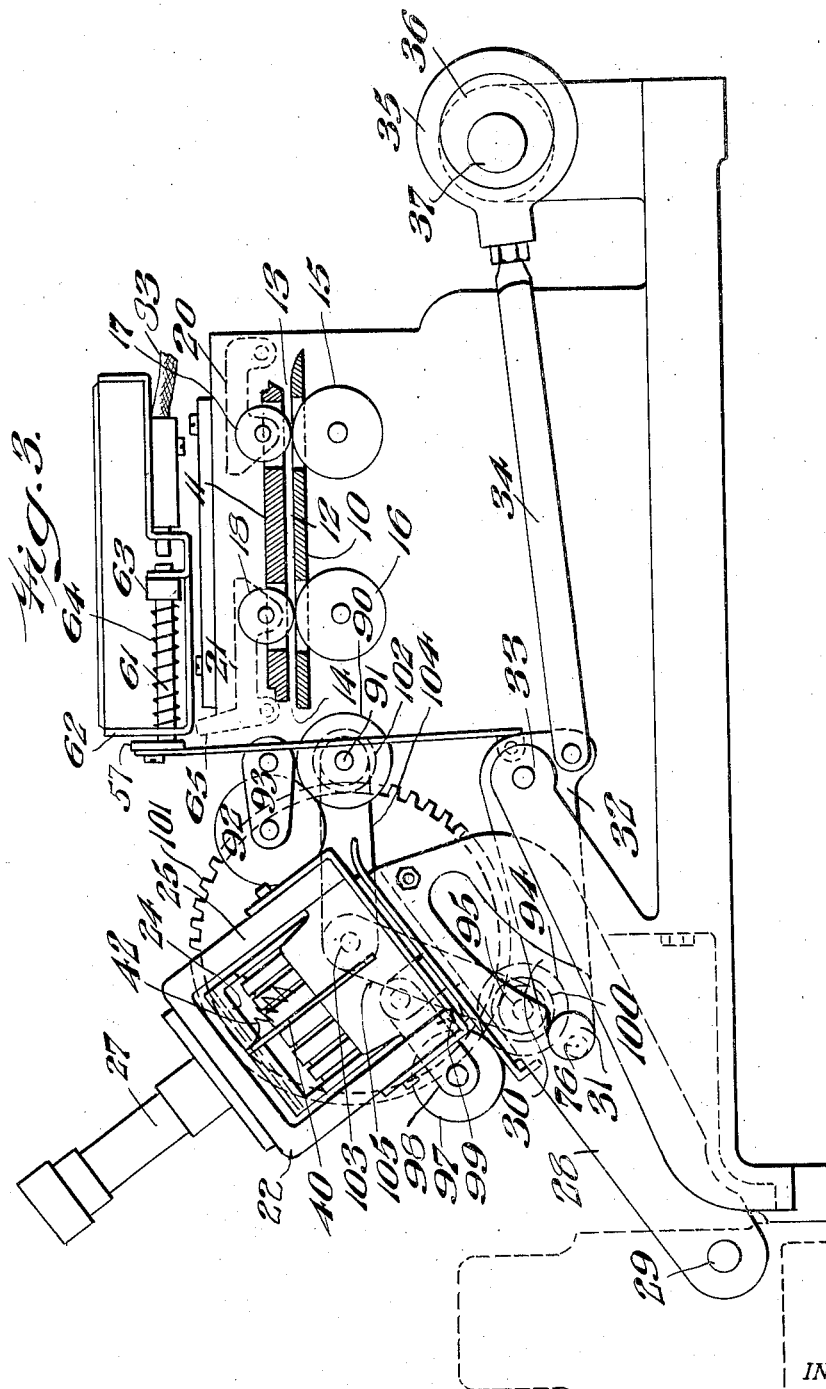
INVENTOR
William W. Lasker.
BY Robert M. Barr,
ATTORNEY Sept. 18, 1928.  W. W. LASKER  1,684,545
NUMBERING AND COUNTING DEVICE
Filed May 15, 1924  4 Sheets-Sheet 4
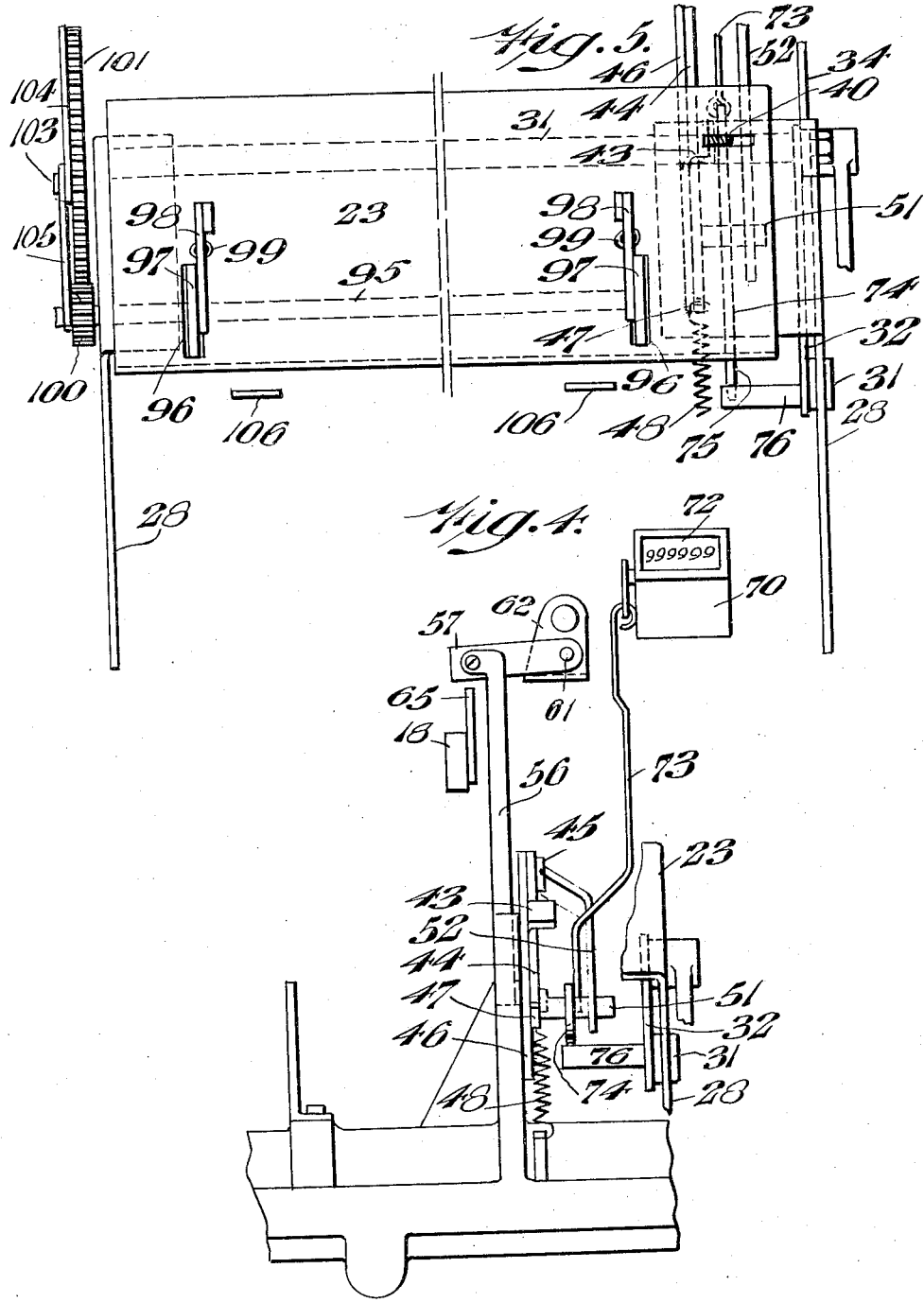
INVENTOR
William W. Lasker.
BY Robert M. Barr
ATTORNEY Patented Sept. 18, 1928.

1,684,545

UNITED STATES PATENT OFFICE.

WILLIAM W. LASKER, OF BROOKLYN, NEW YORK, ASSIGNOR, BY MESNE ASSIGNMENTS, TO REMINGTON RAND INC., OF NEW YORK, N. Y., A CORPORATION OF DELAWARE.

NUMBERING AND COUNTING DEVICE.

Application filed May 15, 1924. Serial No. 713,534.

The present invention relates to printing devices for numbering pieces of material and more particularly to the numbering and counting of cards such as employed with accounting machines. Cards of this character are subdivided by printed fields of numbers or other characters, each field corresponding to some predetermined class, characteristic, item, account or any object or subject regarding which statistical data is desired. Thus each card is punched or perforated in each field according to the data or symbol to be tabulated after which the cards are tabulated on machines designed to function in response to the prearranged card perforations.

Some of the objects of the present invention are to provide means for automatically printing a number on each card so that the cards are not only separately identified by different numbers but the punched data is in this way correlated to the numbered cards; to provide means for counting the number of cards passed through the printing numbering device; to provide means operating in conjunction with a card numbering device for detecting cards which are being improperly fed or are out of register and causing the numbering device to become inoperative in so far as numbering that particular card is concerned; to provide means for causing a card numbering device to function only when cards are being fed and which properly register in the machine; to provide means for causing consecutive numbering of a plurality of cards, said means being arranged to be rendered inoperative for a series of cards which fall under the same number; to provide means for giving the total number of cards passing through a machine regardless of the numbers printed on the cards; and to provide other improvements as will hereinafter appear.

In the accompanying drawings, Fig. 1 represents a side elevation in part section of a card numbering card counting mechanism embodying one form of the present invention; Fig. 2 represents the same showing the parts in number printing position; Fig. 3 represents a side elevation with certain parts removed to show the card ejector operating means; Fig. 4 represents a detail in front elevation of the actuating means for the numbering and counting mechanism; Fig. 5 represents a detail in plan showing the arrangement of the printing numbering device with respect to the ejector mechanism; Fig. 6 represents a detail in front elevation of the operating means for the printing numbering device; Fig. 7 represents a perspective detail of one of the control latches; Fig. 8 represents a detail of the control slide plate; and Fig. 9 represents a detail of the main control latch.

Referring to the drawings, one form of the present invention is shown as applied to a card punching machine comprising a head 6. (Fig. 2), operated by a lever 7 from a cam 8 on the main shaft as shown in U. S. Letters Patent No. 1,305,557 granted June 3, 1919 to W. W. Lasker. This head supports card supporting and registering plates 10 and 11 spaced to provide between them a card path 12. The card enters the card path 12 at the entrance 13 and leaves at the exit 14 and is fed through by the action of friction rollers 15 and 16 operating through the slotted plate 10 in conjunction with upper rollers 17 and 18 arranged respectively in the same vertical plane. The rollers 17 and 18 are mounted respectively on arms 20 and 21 which are pivoted to the movable head carrying the plates 10 and 11, so that the two rollers 17 and 18 move with the card during the punching or perforating operation and hold it in conjunction with the lower friction rollers 15 and 16. It will be understood that the plates 10 and 11 carry the card between them into engagement with the punches or perforating mechanism which is acting upon the card, and after this is completed the plates 10 and 11 return to their former position and the card is fed out by way of the opening 14.

For the purpose of successively and consecutively numbering the cards after the perforating operation, a numbering printing device 22 is provided and mounted at a convenient location in the present instance upon the ejector plate 23 which is arranged to receive the cards after the perforating operation and deliver them successively to a suitable magazine or stacking device. This numbering printing device 22 may be of any well known type in which printing numbering wheels are set by a reciprocable carrier 24 moving in a frame 25 so that numbers are impressed consecutively upon successive cards by the movement of the carrier 24 through the face opening 26 of the frame 25. In the present construction, the printing numbering device 22 is shown as of the plunger type having a handle 27 which in the ordinary use of the device functions to cause the carrier 24 to travel to the impression position, and when released returns the carrier 24 to its initial position whereby its mechanism causes the numbering unit to shift to bring the succeeding number into place for printing upon the next card during the following stroke. In the present instance, the action of the ejector 23 is employed to cause the necessary stroke of the carrier 24 to take place at the proper time to impress a number upon a card leaving the perforating machine.

In order to actuate the plate 23, it is mounted at its ends upon rock arms 28, which are pivoted at 29 to the main frame, and one of which has a cam groove 30, (Fig. 3), formed therein to receive a cam abutment head 31 projecting to one side of a bell crank 32 pivoted at 33 to a fixed part. The opposite arm of the bell crank 32 is connected by a link 34 with an eccentric strap 35 which is mounted about an eccentric 36 of the main operating shaft 37, and in consequence the movement of the link 34 causes the bell crank 32 to rock in a direction to shift the rod 31 within the cam groove 30. On an ejecting action, therefore, the rock arm 28 turns counter-clockwise so that the ejector plate 23 is swung correspondingly and thus carries the card away from the perforating mechanism and delivers it to a suitable receptacle adjacent the discharge end of the plate 23. The ejector plate 23 therefore has a continuous rocking movement which is so timed with respect to the feed of the cards that it assumes its card receiving position adjacent the exit 14 just as the card is discharged therefrom. When the card is received the ejector plate 23 moves away on its discharge or ejecting stroke which takes place while the next succeeding card is being punched or otherwise operated upon by the machine. In this way the cards are successively removed and delivered to the receptacle one at a time in stacked relation.

In order to cause the number printing carrier 24 to move to its impressing position upon a card, it has a pull rod 40, (Fig. 7), pivoted at one end to it, the other end of which terminates in a latch 41 which is normally held by a spring 42 in a path to intercept a catch lug 43, (Fig. 6), formed as a lateral projection of a finger 44. The finger 44 is pivoted at 45 to a slide plate 46, (Figs. 2 and 8), and has its opposite end formed with a hook or lug 47 to receive an end of a spring 48 which is so secured to a fixed part as to be under the required tension to operate the plate 46 when the latter is released. The action of the spring 48 is to pull the finger 44 in a direction to bring the catch 43 into the path of movement of the latch 41 when printing is to take place to thus prevent the rod 40 from moving with the frame 25 of the printing and numbering device. The slide 46 is slidably supported by suitable slots 49 riding respectively on pins 50 fixed to a frame part and is provided with a laterally projecting pin 51 arranged to be actuated in one direction by an operating link 52 and in the opposite direction by the spring 48 in conjunction with a spring 53 connected to the hook 47. Normally the catch 43 is held out of the path of the latch 41 because the slide 46 is held retracted against tension of the springs 48 and 53 by means of a latch 54 engaging at one end with a notch 55 in the slide 46, the said latch being pivoted intermediate of its ends and having its opposite end connected to an operating rod 56, the actuation of which will be later explained. In the present instance, the movement of the rod 56 in a direction to cause the latch 54 to swing counter-clockwise will release it from the notch 55 and thereupon the released slide 46 with its attached finger 44 snaps to the left, as seen in Fig. 1, until its movement is stopped by the slots 49 coming into contact with the pins 50 as shown in Fig. 2. In this stopped position the catch 43 is directly in the path of the latch 41, and consequently, when the ejector plate 23 is swung in a counter-clockwise direction, the latch 41 engages the catch 43 and is prevented from following the movement and therefore the numbering carrier 24 is held stationary while the frame 25 and its adjuncts move relative to it and allow the set number to be printed when the card is brought into contact with it.

For detecting a card and causing the rod 56 to be actuated, the upper end of the rod 56 is connected to a trip bar 57, (Fig. 4), pivoted at 58 on the projecting end of a push pin 61 which is mounted for endwise sliding movement in a suitable frame 62, (Figs. 1, 2 and 3). The pin 61 is provided on its inner end with a head 63, which forms an abutment for one end of a coil spring 64, the opposite end of which is under compression against the frame 62 and thus holds the trip bar 57 normally in a predetermined position. The trip bar 57 is normally so located that it is in one path of movement of a trip lug 65, which forms one arm of a bell crank lever of which the opposite arm is the arm 21 for supporting the roller 18, and the arrangement is such that when there is a card in the card passage 12, the roller 18 will be spaced from the roller 16 as shown in Figure 2 a distance equal to the thickness of the card and consequently the arm 65 will be swung to a position where it will engage the trip bar 57 when the card plates 10 and 11 move for a perforating operation. On the other hand, when there is no card in the card passage 12 or when the card in the passage is out of register, the roller 18 will remain in contact with the roller 16 and the trip lug 65 will move in a path to one side of the trip bar 57 as is apparent from Figures 1 and 2 and the latter will not be operated on that stroke of the perforating mechanism. The trip bar 57, trip lug 65, and the bell crank carried roller 18 form a detecting or card sensing mechanism by which the numbering and printing device is controlled, and as a result as long as cards are fed regularly and are properly registered they will be printed with numbers consecutively, but when a card fails to feed or does not properly register the numbering and printing device does not function.

For the purpose of counting the number of cards passing through the perforating machine any suitable counting mechanism may be employed, that here illustrated being a Veeder counter 70 which operates by means of a reciprocable rock arm 71 so that each stroke adds one number to the total shown on an indicator 72, (Fig. 4). The rock arm 71 is connected by an operating rod 73 to one end of a lever 74 which is pivoted upon the pin 51 and has an operating end 75 arranged in one position of the lever 74 to be in the path of movement of a trip pin 76, (Figs. 3, 4 and 5) fixed to and laterally projecting from the arm 32. The pin 51 extends through a slot 77, (Fig. 2), in the link 52 and the lost motion connection allows the link 52 to move relative to the slide 46 when the link 52 returns after an operating stroke. Motion is transmitted to the link 52 by a pivoted rocker bar 78, the free end of which terminates in a roller 80 riding on the face of a cam 81 mounted on the shaft 37. A spring 82 is arranged to hold the roller 80 in contact with the cam 81 and the motion imparted to the link 52 is a periodic one so timed as to return the slide 46 after each numbering and counting step.

As a means for rendering the printing numbering device 22 and the counter 70 inoperative during the passage of a card or cards through the perforating machine, a rod 83 preferably of a flexible type is mounted for sliding movement with one end in alignment with the inner end of the push pin 61, while its opposite end is in the path of movement of a plunger 84 which extends to a convenient place for manual operation and terminates in a handle knob 85 which also serves as an abutment for a coil spring 86 so that the plunger 84 is normally held retracted. A stop 87 is attached to the plunger 84 to limit its outward movement under the action of the spring 86.

The means whereby a card is fed to the ejector plate 23 comprise, in the present instance, feed rollers 90 driven from a shaft 91 and friction rollers 92 mounted in pivoted holders 93 so that they normally rest upon the rollers 90 but yield when a card is fed between them and the rollers 90. The two sets of feed rollers 90 and 92 are so located with respect to the receiving position of the plate 23 as to deliver a card directly thereon. The plate 23 is likewise provided with feed rollers which are preferably so located and arranged as to engage the front edge of the card before its rear edge has passed out of the feed rollers 90 and 92. The plate rollers consist of two rollers 94 mounted upon and driven by a shaft 95 which extends below and parallel to the face of the plate 23, being spaced therefrom a distance less than the radius of the rollers 94 so that the latter project through suitably cut slots 96 to contact with a card on the plate 23. Friction rollers 97 are mounted respectively on pivoted links 98 in position on the respective circumferential faces of the rollers 94 with a pressure determined by suitable coil springs 99. The shaft 95 is suitably journalled to move with the plate 23 and is driven by a gear 100, (Figs. 3 and 5), keyed thereon and in mesh with a relatively large idle gear 101 which receives its motion from a gear 102 on the driven feed shaft 91. In order that due allowance may be made for the change of center of the gear 101 due to the rocking motion of the gear 100, the gear 101 is journalled on a pivot 103 common to two links 104 and 105 which serve as supports from the respective shafts 91 and 95. Thus a card leaves the feed rollers 90 and 92 and is received upon the ejector plate 23 where its front edge passes between the rollers 94 and 97 so that the card is fed into position upon the plate and comes to rest against stop fingers 106, (Figs. 1 and 5). In this position the friction rollers 97 remain idle but when the plate 23 moves to the ejecting position the card passes beyond the ends of the fingers 106 and the frictional action of the rollers 97 is then effective to discharge the card into the adjacent receptacle.

In describing the operation of the device, it will first be assumed that a card has entered the card passage 12 of the card register plates 10 and 11 of the perforating machine and is registered accurately for the punching operation. The feeding in of the card has been effected by the feed rollers 15 and 16 in conjunction with the top rollers 17 and 18 and these latter are moved upward a distance equal to the thickness of the card. As a result the arm 21 swings in the direction to locate the trip arm 65 beneath the trip bar 57 and therefore when the plates 10 and 11 move upward on the card punching stroke the trip arm 65 will engage the trip bar 57 and swing it about the pin 61 to cause the rod 56 to release the latch 54. When the latch 54 is removed from the locking notch 55 the slide 46 is released so that the spring 48 draws it and the finger 44 to a new position where the catch lug 43 is in the upward path of movement of the latch 41 of the pull rod 40 attached to the movable printing numbering unit. The movement of the slide 46 is transmitted by the pin 51 to the lever 74 which shifts to a position where its end is in the path of the pin 76 and when the latter trips the lever 74 the rod 73 is actuated to rock the crank 71 for a working stroke of the counter mechanism 70.

As soon as the card perforating step has taken place the card is fed out of the passage 12 and is transferred by feed rollers 90 and 92 to the ejector plate 23 where it is in the path of the printing numbering unit 24. At this time, the eccentric 36 reaches a position where it causes the link 34 and arm 32 to move the head 31 along the cam path 30 and thereby swing the ejector plate in a counter-clockwise direction. The frame 25 of the card printing numbering mechanism moves with the ejector plate 23 but the printing unit 24 is prevented from following the movement because the pull rod 40 is held by the engagement of the latch 41 with the catch lug 43. Consequently, when the card reaches the printing face of the unit 24, it has the number, which is set in the unit, impressed upon its face. In order to allow for a cushioning of the impression impact the spring 53 is provided between the finger 44 and slide 46. When the counting and numbering of the card has taken place, the cam controlled link 52 is shifted in the direction to return the plate 46 to its normal position and thereby removes the catch lug 43 from the latch 42 so that the numbering unit is released. Also the lever 74 moves out of the path of the trip pin 76 ready to be controlled by the next card.

In case a card fails to feed into the passage 12 and the perforating machine operates without a card, the upward movement of the plates 10 and 11 will take place without any change in the position of the trip arm 65. In other words, the roller 18 in the absence of a card is resting on the roller 16 and the trip arm 65 therefore moves upward in a path to one side of the trip bar 57. As a result there is no release of the slide plate 46 and the catch lug 43 remains out of the path of the latch 41 and the lever 74 also out of the path of the pin 76 so there is no relative movement of the printing unit 24 with respect to the frame 25 and no numbering or counting takes place. The same action takes place if a card does not properly register upon the card plate 10 and therefore the machine only functions for numbering and counting when the proper cards are being fed through.

By the provision of the manual control 85 which is preferably located convenient to the keyboard of the perforating machine it is possible to control the operation of the printing, numbering and counting at will; thus, by pushing the plunger 84 into engagement with the transmitting push spindle 83, the latter is caused to engage the rod 61 and thereby move the trip bar 57 out of the path of movement of the trip arm 65 when the arm 65 is set by a card. Thus one card or a series of cards can be perforated without numbering and printing upon them, thus making it possible to number one card only of a series of repeated perforated cards, the balance being passed through without numbering and printing. At any time therefore the operator can render the printing numbering mechanism inoperative while cards are still passing through the perforating machine.

It will now be apparent that a complete unitary printing numbering and card counting mechanism has been devised for card perforating machines or any other machines through which cards are fed automatically. The numbering mechanism of the present invention is arranged to operate in conjunction with a detecting device whereby the card position in the machine directly controls the operation of the numbering printing device so that where there is a defective feed of the card the numbering printing device will not operate and the serial numbered position of the numbering device will be maintained. Furthermore, provision is made for totaling the number of cards which pass through the machine and are automatically numbered and printed, and this totalizing counter is so arranged with respect to the numbering device that if a card is passed through the machine without being numbered, it is not counted.

Although but one form is shown in which this invention may be embodied, it is to be understood that the invention is not limited to any specific construction, but might be applied to various forms without departing from the spirit of the invention or the scope of the appended claims.

Having thus described my invention, I claim:

1. In a mechanism of the character stated, the combination of a machine having a reciprocable registration device for separately acting upon a series of cards, means for printing numbers on said cards, and means actuated by a card in said device for permitting said printing means to function.

2. In a machine of the character stated, the combination of a machine having a reciprocable registration device for separately acting upon a series of cards, means for counting the number of cards passing through said registration device, and means actuated by a card in said device for permitting said counting means to function.

3. In a mechanism of the character stated, the combination of a machine having a reciprocable registration device for separately acting upon a series of cards, means for printing numbers on said cards, and means actuated by a card in said device for effecting operation of said printing means.

4. In a machine of the character stated, the combination of a machine having a reciprocable registration device for separately acting upon a series of cards, means for counting the number of cards passing through said registration device, and means actuated by a card in said device for effecting operation of said counting means.

5. In a mechanism of the character stated, the combination of a machine having a reciprocable registration device for separately acting upon a series of cards, means for printing numbers on said cards, a counting mechanism for totaling the number of cards printed, common means for latching said printing means and said counting mechanism to prevent operation thereof, and means actuated by a card in said device for releasing said latching means to permit said printing means and said counting means to function.

6. In a mechanism of the character stated, the combination of a machine having a reciprocable registration device for separately acting upon a series of cards, means for printing numbers on said cards, and means for preventing operation of said printing means when said device reciprocates in the absence of a card.

7. In a mechanism of the character stated, the combination of a reciprocable registration device for a card perforating machine, means for feeding cards successively to said machine, means for printing numbers on said cards, and means including a card detecting device operated by said device for controlling the operation of said printing means.

8. In a mechanism of the character stated, the combination of a reciprocable registration device for a card perforating machine, means for feeding cards successively to said machine, means for printing numbers on said cards, and means including a trip device operated by said registration device for controlling said printing means, said trip device functioning to operate said printing means when a card is in said machine and failing to operate said printing means when a card is misfed or no card is in said machine.

9. In a mechanism of the character stated, the combination of a reciprocable registration device for a card perforating machine, means for feeding cards successively to said machine, means including a frame and a movable unit for printing numbers on said cards, means for reciprocating said frame and unit, and means controlled by said perforating machine for preventing movement of said unit when said frame moves whereby a number is printed on a card.

10. In a mechanism of the character stated, the combination of a reciprocable registration device for a card perforating machine, means for feeding cards successively to said machine, means including a frame and a movable unit for printing numbers on said cards, means for reciprocating said frame and unit, a card detecting device, and means operated by said detecting device for controlling the movement of said movable unit whereby a printing operation takes place only when a card is in said machine.

11. In a mechanism of the character stated, the combination of a reciprocable registration device for a card perforating machine, means for feeding cards successively to said machine, means including a frame and a movable unit for printing numbers on said cards, means for reciprocating said frame and unit, and means operated by reciprocation of said device under control of a card in said machine for holding said movable unit in printing position while said frame moves whereby a number is printed on said card.

12. In a mechanism of the character stated, the combination of a reciprocable registration device for a card perforating machine, means for feeding cards successively to said machine, means for counting the total number of cards, and means including a trip device for controlling said counting means, said trip device being operated by said registration device to control said counting device when a card is in said machine and failing to operate said counting means when a card is misfed or no card is in said machine.

13. In a mechanism of the character stated, the combination of a reciprocable registration device for a card perforating machine, means for feeding cards successively to said machine, means for printing numbers on said cards, a device for counting the total number of printed cards, and means including a card detecting mechanism for controlling said printing means and said counting device, said detecting mechanism being operated by said registration device to cause an operation of said printing means and said counting device when a card is in said machine and failing to cause an operation of said counting means and said printing means when a card is misfed or no card is in said machine.

14. In a mechanism of the character stated, the combination of a machine for separately acting upon a series of cards, means for automatically counting the total number of cards, and plunger operated mean for rendering said counting means inoperative at will while said machine is operating.

15. In a mechanism of the character stated, the combination of a machine for separately acting upon a series of cards, means for printing numbers on said cards, means for automatically counting the total number of cards, and plunger operated mean for rendering said counting means inoperative at will while said machine is operating.

16. In a mechanism of the character stated, the combination of a vertically reciprocable card registration device, a feeding mechanism for successively feeding cards through said device, a printing element arranged to be operated to print on said cards, means for permitting the actuation of said printing element, and means travelling with said registration device for operating said permitting means when a card is in register in said device.

17. In a mechanism of the character stated, the combination of a vertically reciprocable card registration device, a feeding mechanism for successively feeding cards through said device, a printing element arranged to be operated to print on said cards, means for permitting the actuation of said printing element, and a trip means carried by said registration device and arranged to move in a path to intercept and operate said permitting means when a card is in register, and to move in a path to one side of said permitting means when a card is out of register or in the absence of a card.

18. In a mechanism of the character stated, the combination of a vertically reciprocable card registration device, a feeding mechanism for successively feeding cards through said device, a printing element arranged to be operated to print on said cards, a counting device associated with said parts, means including a trip bar for causing operation of said printing element and said counting device, and a trip lug pivoted to said registration device and arranged in the absence of a card to travel out of the path of said trip bar but in the presence of a card to be projected into the path of said trip bar whereby said printing element and counting device are caused to function.

Signed at Philadelphia, county of Philadelphia, State of Pennsylvania, this 5th day of May, 1924.

WILLIAM W. LASKER.